Figure 2:
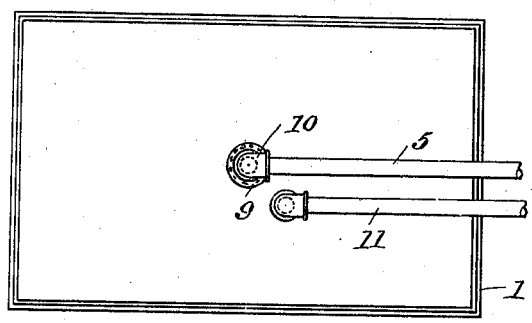

July 17, 1923.

L. C. NORDMEYER 1,461,828

PROCESS AND APPARATUS FOR MAKING ICE

Filed Jan. 6, 1922

INVENTOR
Louis C. Nordmeyer
BY
Elliott & Ammen
ATTORNEYS

Patented July 17, 1923.

1,461,828

UNITED STATES PATENT OFFICE.

LOUIS C. NORDMEYER, OF ST. LOUIS, MISSOURI.

PROCESS AND APPARATUS FOR MAKING ICE.

Application filed January 6, 1922. Serial No. 527,291.

*To all whom it may concern:*

Be it known that I, LOUIS C. NORDMEYER, a citizen of the United States, residing in the city of St. Louis and State of Missouri, have invented new and useful Improvements in Process and Apparatus for Making Ice, of which the following is a specification.

This invention relates to ice making. It is now the common practice in making can ice to employ distilled water for the reason that undistilled or raw water contains a small quantity of air, and sometimes gases, the effect of which is to produce an accumulation of air or gas bubbles as the freezing progresses, and these bubbles become frozen into the ice cake. In this way a "white" or relatively opaque condition is produced in the ice which materially reduces its salability. The necessity for employing distilled water also substantially increases the cost of producing ice.

The general object of the present invention is to provide a process and apparatus for making ice which will enable undistilled or distilled water to be used, at the same time producing clear and substantially perfect ice.

A further object of the invention is to provide a method and apparatus which will facilitate the production of clear ice without necessitating making any change in the construction of the ice-can as now employed for making ice.

Further objects of the invention will appear hereinafter.

The invention consists in the novel acts, and combination of acts to be particularly described hereinafter, and in the novel features of the apparatus, all of which contribute to produce a simple and efficient process for making ice. A preferred embodiment of my invention will be particularly described in the following specification, while the broad scope of my invention will be pointed out in the appended claims.

The invention also resides in the apparatus described in the following specification and set forth in the claims.

Figure 1:
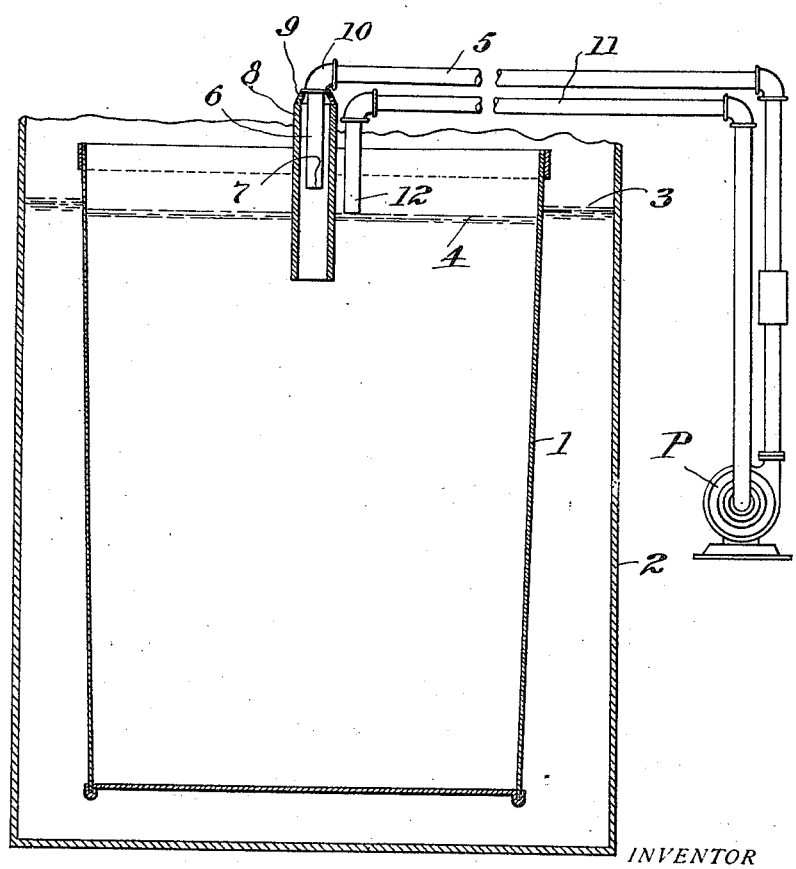

In the drawing,

Figure 1 is a vertical section through a container or can and illustrating the apparatus which I prefer to employ for practicing my process; and Figure 2 is a plan of the can and a part of the apparatus.

In practicing my process I provide a container such as the common freezing can 1 and this can is placed within a tank 2. I subject the raw or undistilled water within the can to the action of a refrigerating medium circulated through the tank 2. The level of this medium is indicated at the point 3 which is preferably slightly above the level 4 of the water within the can, or container 1.

According to my process, while subjecting the water to be frozen to the action of the refrigerating medium, I inject into the mass of water a relatively small quantity of water. This may be accomplished in any suitable manner, but I prefer to effect this by means of a small stream of water emitted in an unconfined stream just above the water level and directed or projected down into the interior of the can from above. This projected stream should be located in the central or medial plane of the mass of water being frozen, that is to say, substantially on the central vertical axis of the can. The effect of this injected stream is to produce a dispersion of air or gas bubbles which may form within the water. Furthermore, the effect of the jet of water is augmented by injecting the stream in such a way as to entrain atmospheric air with the stream, so that a small quantity of air is carried into the freezing mass of water.

In order to accomplish this I provide a water inlet in the form of a pipe 5 which extends out over the water so as to carry a downwardly extending nozzle 6; where the freezing is uniform on all sides I locate this nozzle on the central vertical axis of the can. The delivery mouth or lower extremity 7 of this nozzle 6 is preferably disposed slightly above the level 4 of the water in the can, determined by the level of the water outlet and in order to entrain air with the stream of water I confine the atmospheric air around the nozzle by means of a small tube or pipe 8 of slightly larger diameter than the nozzle 6. This tube 8 may be supported by a perforated conical shell 9 from an elbow 10 which connects the pipe sections 5 and 6. I also maintain a substantially constant level of the water within the container while the freezing is taking place.

With this organization of apparatus, as the stream of water is emitted with considerable velocity from the nozzle 6 air will be drawn in through the perforated cone 9 and a certain quantity of this air will be carried down into the interior of the freezing water.

In order to maintain a constant level, and at the same time, to enable the usual ice "can" to be employed, I draw off water at the surface level and at a point below the edge of the can. This obviates the necessity of providing any connections through the side wall of the can. In order to do this I simply provide an outlet, preferably in the form of a suction pipe 11 connected with a circulating pump P, and this pipe has a downwardly extending suction nozzle 12, the lower end of which is located at the point desired for the level 4 of the water within the can.

The water drawn off by the pump is returned through the pipe connection 5 to the inlet nozzle. In this way the water being circulated is refrigerated and hence the work of refrigerating that has been expended on the water drawn off, is not lost. This is one of the advantageous features of my invention.

If the apparatus is left open as illustrated, the entrained air can, of course, escape into the atmosphere, but if the can is provided with a cover then the nozzle 12 will not only operate to withdraw the superfluous water, but will also carry off any air accumulating in the can above the water level.

By employing the suction pipe 12 with its mouth disposed at the surface of the water and below the edge of the can, I avoid the necessity for making any pipe connections whatever through the wall of the can, and hence the cans which are now in use can be readily used for practicing my invention.

It is understood that the embodiment of the invention described herein is only one of the many embodiments my invention may take, and I do not wish to be limited in the practice of my invention nor in my claims, to the particular embodiment set forth.

What I claim is:

1. The process of making ice from undistilled water held in a freezing can, which consists in subjecting the can to the action of a refrigerating medium, injecting a stream of water under pressure through a confined air space and into the mass of water within the can so as to entrain air with the stream of water passing into the can, and maintaining a substantially constant level of the water within the can.

2. In the process of making ice from undistilled water held in a freezing can, the step of emitting an unconfined stream of water into the space above the water level and directed down into the water in the can while the ice is forming.

3. The process of making ice from water held in a container, which consists in subjecting the same to the action of a refrigerating medium, drawing off water from the surface thereof, and at a point below the edge of the container and returning the withdrawn water in an unconfined stream emitted at a point above the water level and directed down into the water within the container.

4. In ice making apparatus, the combination of a container for holding the water to be frozen, means for subjecting the container to the action of a refrigerating medium, means including a nozzle for emitting an unconfined stream of water into the air at a high level in the container, so that the same is emitted at a point above the surface of the water and directed into the water while it is being frozen, and a tube below the nozzle and in a position to surround the stream of water, extending to a lower level than the nozzle so as to project below the level of the water in the container, said tube being open above so that the stream of water entrains air as it passes downwardly into the container, and means for maintaining a substantially constant level for the water in the container.

5. In ice making apparatus, the combination of a container for holding the water to be frozen, means for subjecting the container to the action of a refrigerating medium, a suction pipe with its mouth disposed at a high level in the container, a pump for withdrawing surface water from the container through the suction pipe so as to maintain the level of the water substantially at the mouth of the suction pipe, an inlet nozzle with its lower end disposed just above the mouth of the suction pipe so as to lie above the surface of the water in the container, and a connection delivering water from the pump to the inlet nozzle, said inlet nozzle operating to emit an unconfined stream of water through the air and down into the water in the container.

6. In ice making apparatus, the combination of a container for holding the water to be frozen, means for subjecting the container to the action of a refrigerating medium, an outlet for the water located at an elevated point in the container, a water inlet having its delivery opening located above the level of the outlet, a pump for withdrawing water by the outlet and operating to maintain the level of the water in the container substantially at the level of the outlet, a connection from the pump to the inlet for returning the withdrawn water to the inlet, said inlet operating to emit the water in an unconfined stream into the air above the level of said outlet, and a tube below the inlet in a position to surround the unconfined stream of water, extending to a point near the level of the outlet so as to project below the level of the water within the container, said tube being open above to the atmosphere so that the stream of water emitted from the inlet entrains air as it passes downwardly into the container.

In testimony whereof, I have hereunto set my hand.

LOUIS C. NORDMEYER.